Figure 1:
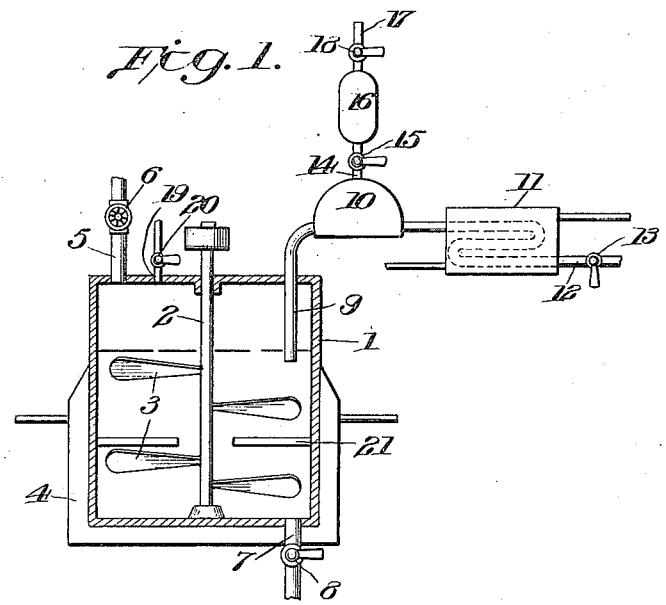

C. ELLIS.
HYDROGENATING UNSATURATED ORGANIC MATERIAL.
APPLICATION FILED APR. 24, 1912.

1,138,201.

Patented May 4, 1915.

UNITED STATES PATENT OFFICE.

CARLETON ELLIS, OF MONTCLAIR, NEW JERSEY.

HYDROGENATING UNSATURATED ORGANIC MATERIAL.

1,138,201.  Specification of Letters Patent.  Patented May 4, 1915.

Application filed April 24, 1912.  Serial No. 692,903.

*To all whom it may concern:*

Be it known that I, CARLETON ELLIS, a citizen of the United States, and a resident of Montclair, in the county of Essex and State of New Jersey, have invented certain new and useful Improvements in Hydrogenating Unsaturated Organic Material, of which the following is a specification.

This invention relates to the process of hydrogenation of unsaturated organic bodies, such as hydrocarbon oils and fatty material in the presence of catalytic bodies capable of carrying hydrogen to such organic compounds and relates in particular to the use of volatile catalyzers, or catalyzers which acquire their active properties only by heating in a predetermined manner, such catalytic compounds preferably being of the nature of nickel carbonyl, and similar volatile bodies, preferably of an oil-soluble character.

In the present invention it is particularly the object to provide a catalytic body which is capable of being decomposed by heat in the presence of an oil or similar substance to be treated and in the presence of hydrogen or hydrogen containing gas, whereby metallic nickel or other similar material, in a very finely divided form, or even in a nascent condition, is secured.

Processes heretofore suggested for the treatment of oil with hydrogen in the presence of catalyzers, have been concerned with catalyzers of a non-volatile character, such for example as nickel which has been reduced from its oxid by treatment with hydrogen. It is difficult to prepare a nickel catalyzer in this way because slight variations in the temperature, when reducing the nickel oxid by hydrogen gas seemingly cause variations in the physical character and activity of the reduced nickel. In the present invention, in its preferred form, nickel carbonyl is used, and this is a potential catalyzer in that it decomposes on heating to form a suitable catalytic body.

Nickel carbonyl is readily prepared by passing carbon-monoxid over finely divided nickel at a temperature of from 50° to 100° C. This compound, as is well known, is volatile and mixes readily with gases, such as carbon-monoxid and hydrogen. When heated in the air, it is very quickly decomposed and is also affected by moisture. In the absence of air, it is decomposed by heating to a temperature of 200° C., or even less and when so decomposed by heat, the nickel is set free in a very finely divided form. Nickel carbonyl is readily soluble in many oily bodies, which is a property useful in the treatment of many of the unsaturated hydrocarbons or the fatty oils referred to.

In carrying out the present invention I preferably mix the nickel carbonyl with hydrogen gas, or water gas, or other gas suitable for the purpose and pass this mixture into an oil or other organic body to be treated. The oil is maintained at the decomposition temperature of the nickel carbonyl and also, preferably, at a temperature suited for rapid hydrogenation. Thus, the catalyzer is liberated in intimate contact with hydrogen gas, thereby effecting a rapid hydrogenation of the oil. The oil may contain, if desired, finely divided solid material, such as fullers' earth and the like, to serve as an attaching base for the deposited or separated nickel; but the use of such solid material is often undesirable and the nickel in its nascent form liberated by heat decomposition and in the absence of solid material to which it may become attached, is usually more desirable. In case the nickel forms a colloid, which is not readily removed by filtration, the oil may be boiled with an aqueous acid solution, to remove such nickel material, after it has served its purpose.

When treating material of a volatile nature the mixture of hydrogen and nickel carbonyl may be caused to mingle with vapors of the volatile body and pass through a heated tube, or heated in any other suitable way, to convert the vaporized potential catalyzer into an active nascent catalyzer. In this way various unsaturated fatty acids may be treated, using diminished pressure in order to form the vapors of such fatty material without producing any material amount of tarry bodies. Fatty esters, such as corn and cotton-seed oil, soya bean oil, fish oil, almond oil, peanut and mustard oils, castor oil, linseed oil, Chinese wood oil and the like, are best treated in the liquid form. A variety of low grade greases may be treated in this way to deodorize and improve their consistency. Among these may be mentioned sewer and garbage grease and under certain conditions cotton seed oil foots. These greases may be treated at the same time with hydro-sulfites to cause the material to be simultaneously bleached. In the treatment of castor oil and certain other oils, light colored bodies are best secured by hydrogenating at a low temperature, from say 85° to 125° C. In such cases, it is first desirable to heat the oil to the temperature of decomposition of the nickel carbonyl, introducing the amount of the latter required with the first portion of hydrogen gas brought into contact with the oil. In this way an active nascent catalyzing material is produced and the oil may then be quickly cooled to a temperature better suited for the hydrogenating step proper.

The oil is preferably gently stirred during the process of hydrogenation, so as to bring about more uniform treatment. Violent agitation is not however necessary, owing to the peculiar active property of the nascent nickel catalyzer. The process is best conducted by using oil which has been freed from all traces of moisture and carefully drying the hyrogen gas before use.

As stated, it is desirable to regulate the temperature of decomposition of the nickel compound according to the particular conditions of treatment, varying this according to the oil employed and according to the pressure of the hydrogen gas. In some cases, as indicated, it is desirable to decompose the potential catalyzer at a somewhat higher temperature than that needed for completion of the hydrogenation.

In addition to nickel carbonyl, other volatile bodies having potentially catalytic properties, including the corresponding compounds of iron and the like, and some of the compounds of the metals with hydrocarbons, such for example as the methyl compounds of mercury, zinc, tin, thallium, lead and the like, may be employed.

The accompanying drawings show, in a diagrammatic way, apparatus suitable for carrying out the present invention.

The drawings show the apparatus mainly in vertical section.

Like reference characters denote like parts.

In the drawing, 1 is a closed receptacle and mixing chamber having the agitator 2 which carries the canted propeller blades 3. The receptacle is partially jacketed by the jacket 4, into which steam or other heating agent may be introduced.

5 is an inlet pipe for admitting the oily body or other material to be treated to the receptacle. This pipe carries the valve 6.

7 is an outlet pipe for the withdrawal of the treated oil and carries the valve 8.

9 is an inlet pipe for the admission of hydrogen gas and the potential catalyzer. In the Figure 1, this is shown entering the tank from above, while in Fig. 2, the inlet pipe enters from the under side of the receptacle.

Figure 2:
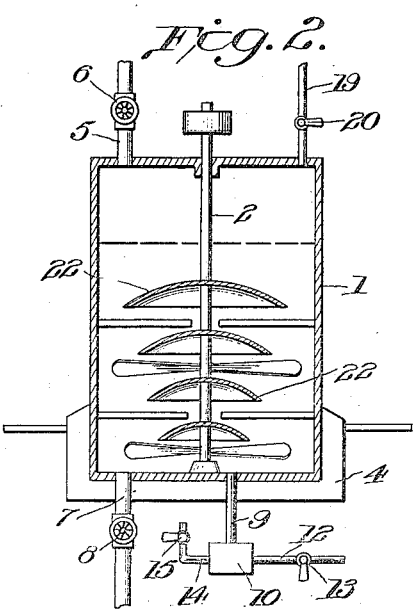

10 is a mixing chamber where the hydrogen, or hydrogen-containing gas is mixed with the volatile catalyzer. In Fig. 1, a heating apparatus for preheating the hydrogen, 11, is shown. The pipe 12, having the valve 13, extends to the mixing chamber 10 and serves for the admission of the hydrogen gas thereto. The pipe 14, having the valve 15, serves for the admission of the catalytic body, as for example nickel carbonyl in a liquid or vaporized form. In Fig. 1, a receptacle 16, having an inlet pipe 17, carrying the valve 18, serves as a closed container for the volatile catalyzer. The pipe 19, having the valve 20, is an outlet, or blow-off. In the receptacle are rods, or plates, shown as 21, projecting from the walls of the receptacle and serving as baffles. Fig. 2, shows the stirrer, 2, carrying gas collectors, 22. These increase progressively in size from the bottom to the top.

The operation of this apparatus for carrying out the process of the present invention is as follows:—In the case of Fig. 1 hydrogen is admitted by the pipe 12, to the preheater 11, and passed to the vaporizer 10. The catalytic material, or potentially active material, is admitted gradually by the pipe 14 to the receptacle 10. The mixture of the hydrogen gas and the potentially active material passes by the pipe 9 into the receptacle 1, which is nearly filled with oil or other material to be treated. The contents of the receptacle are preferably previously heated to a temperature of 150° to 200° C. by means of the heating jacket 4. The agitator is put in motion and the oil gently agitated while the hydrogen gas mixture is admitted to the receptacle. This agitation, which is continued for a substantial period of time, preferably for an hour or more according to the degree of hydrogenation required, insures a prolonged intimate contact of the hydrogen gas mixture with the material under treatment. After hydrogenation is complete, the treated oil is withdrawn from the pipe 7. In Fig. 2, which represents the preferred form of the present invention, the operation is substantially the same, but the hydrogen mixture is admitted from the bottom and collects under the lowest gas chamber or bell. When this is filled the gas passes to the second chamber or bell and so on, filling each of the bells with the gas and catalyzer. Thus the catalyzer is distributed, as it were, as a plurality of layers within the body of the oil and ample time of contact is thus readily secured to enable its complete decomposition. The temperature maintained in the receptacle is sufficient to decompose the catalyzer, which in the case of nickel carbonyl, may often separate to a large extent as a finely divided coating on or near the surface of the oil in the several bells. By means of the pipe 19 and the valve 20, the spent gases may be removed either intermittently or continuously, as desired, and similarly, the hydrogen gas, carrying its charge of nickel carbonyl or other volatile catalyzer may be admitted either intermittently or continuously to the treating receptacle, according to the adjustment of the several valves, as is obvious.

As an illustrative example of the process of the present invention, one may place in the receptacle a charge of, say, cotton seed oil and heat to a temperature of about 180° C. A quantity of nickel carbonyl, equivalent to about 1% or so of the weight of the oil is mingled with hydrogen gas and brought into contact with the oil with gentle agitation for a period of an hour or more according to the degree of hydrogenation required. Thus the nickel carbonyl is confined in contact with the oil for a protracted period which allows of its complete decomposition.

In accordance with the oil to be treated, the pressure of the hydrogen may vary from below atmospheric up to a pressure of 10 lbs. to 25 lbs. to the square inch, or higher.

This application is a divisional continuation in part of Serial No. 688,814, filed April 5, 1912.

What I claim is, -

The process comprising adding nickel carbonyl and hydrogen to unsaturated fatty material, subjecting the mixture to a predetermined temperature sufficient to decompose the nickel carbonyl and cause the resulting nickel and the hydrogen to react upon the unsaturated fatty material and completing the hydrogenation at a lower temperature.

Signed at Montclair in the county of Essex and State of New Jersey, this 22nd day of April, 1912.

CARLETON ELLIS.

Witnesses:
  BIRDELLA M. ELLIS,
  THOS. F. ROCHE.